United States Patent [19]

Beder et al.

[11] Patent Number: 5,057,681

[45] Date of Patent: Oct. 15, 1991

[54] LONG RANGE TRIANGULATING COORDINATE FINDER

[75] Inventors: Douglas S. Beder, Vancouver; Gordon E. Cornwall, North Vancouver; David A. Dieno, Port Coquitlam; Curtis E. Lang, North Vancouver; David S. Sloan, Burnaby, all of Canada

[73] Assignee: Range Vision Inc., Burnaby, Canada

[21] Appl. No.: 558,458

[22] Filed: Jul. 27, 1990

[51] Int. Cl.$^5$ .............................................. H01J 40/14
[52] U.S. Cl. ..................................... 250/208.2; 356/1
[58] Field of Search .................. 250/561, 208.3, 208.2; 356/1, 4, 141, 12, 375, 376

[56] References Cited

U.S. PATENT DOCUMENTS

| | | | |
|---|---|---|---|
| 4,311,382 | 1/1982 | Buckley et al. | 356/4 |
| 4,410,804 | 10/1983 | Stauffer | 250/208.2 |
| 4,732,472 | 3/1988 | König et al. | 356/4 |
| 4,874,239 | 10/1983 | Tamura | 250/208.2 |
| 4,893,025 | 1/1990 | Lee | 250/208.3 |

Primary Examiner—David C. Nelms
Assistant Examiner—Khaled Shami
Attorney, Agent, or Firm—C. A. Rowley

[57] ABSTRACT

A system for establishing a base between a light projecting station and a light receiving station of a triangulating coordinate finder incorporates a target on the light transmitting station and a reflector appropriately positioned relative to a photo sensitive receiving array in the light receiving station. A beam of light is directed through a peep hole through the target onto the reflector and is reflected back onto the target. By adjusting the relative orientation of the two stations so that the light beam is reflected back from the reflecting surface in a direction substantially co-axial with the beam of light projecting through the peep hole the bases of the two stations are arranged to be substantially in the same plane and on a base line. The base length between the two stations is measured and the orientation of the projected beam and the focal axis of the receiving station are established relative to the base line to provide coordinates for the triangulating coordinate finder.

When scanning over long distances, or under conditions of varying ambient light and different colored background, the amount of light received in the light receiving station may vary due to conditions other than the change in distance. It is therefore preferred to threshold the signal received and use only those signals above a pre-determined threshold to establish accepted signals and to examine the overall signal and determine those areas where no accepted signal has been registered and rescan those areas using a slower scan rate, i.e. a longer illumination time (more light applied) per unit area per unit time of exposure or increase the exposure per unit area scanned.

2 Claims, 6 Drawing Sheets

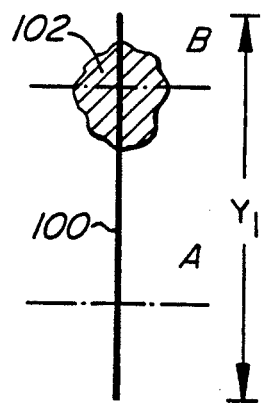 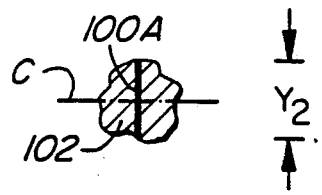
FIG. 9   FIG. 10
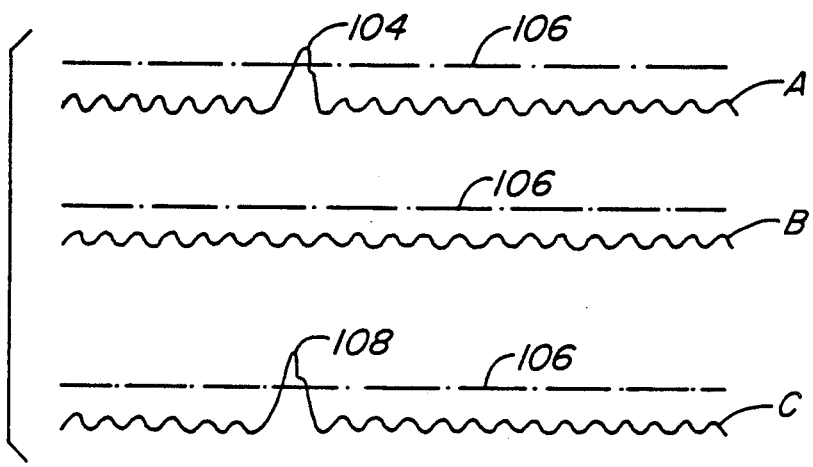
FIG. 11
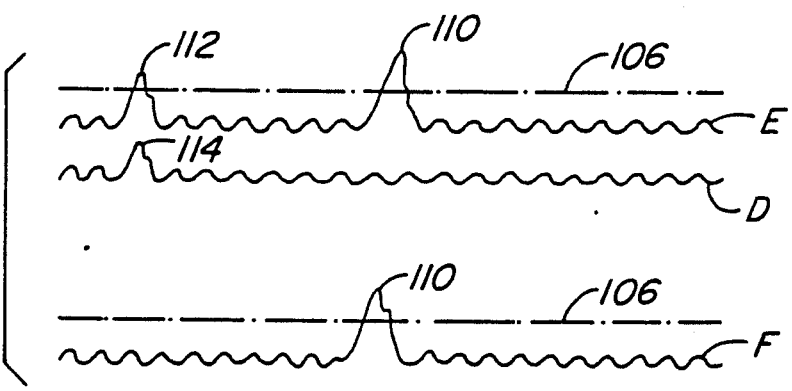
FIG. 12

LONG RANGE TRIANGULATING COORDINATE FINDER

FIELD OF THE INVENTION

The present invention relates to a scanning system. More specifically the present invention relates to a system for establishing a long distance scanning system and an adaptive scanning system for scanning areas of weak signal.

BACKGROUND OF THE PRESENT INVENTION

Devices that locate and measure three dimensional spatial coordinates (x, y, z tuples) by triangulating with projected light beams such as laser light and a camera such as a charge coupled device (CCD) array camera are well known. These devices project a light beam or laser beam in the form of a straight line or a spot moving in a straight line onto the surface to be scanned and form an image of the reflected spot or line of light using the CCD camera. The camera and beam projector are fixed at opposite ends of an interconnecting structure that acts as a base line fixture. The distance between the camera and projector along the base line is fixed and is known and provides a base line for the system. The projector and camera generally have fixed orientation to the base line and in some cases the direction in which the projected light is directed may be rotated about an axis perpendicular to the base line. The angle of the camera's focal axis to the base line fixture is known and the angle of the projected beam to the base line is either known or measured. The projector may project either a line of light extending perpendicular to the base plane (a plane parallel to both the base line and the focal axis of the camera) or a spot of light that is moved at a selected rate along a line perpendicular to the base plane to provide a scan line. This scan line formed on the object reflects light back to the camera to strike the CCD array in the camera at different positions in the array depending on the position of the particular spot the illumination of which is being detected on the array.

It will be apparent that to cover the whole surface area, if the scanning is done say vertically then a plurality of side by side vertical scan lines (horizontally spaced) are successively used to cover the surface of the object being examined. Similarly if the scan lines are horizontal, a plurality of such side by side horizontal lines (vertically spaced) are projected in sequence and measured to obtain data representation of the whole surface of the object being examined.

The spatial resolution attainable with such a device is limited by several factors.

1. The accuracy and resolution of the base line length measurement.
2. The accuracy and resolution of the angular measurement at the initial calibration stage.
3. The accuracy and resolution of successive angular measurements taken as the projector moves the beam across the object being scanned, i.e. the angle of the outgoing beam to the base line.
4. The accuracy and resolution of successive angular measurements taken by the camera of the image of the laser spot (angle of the return beam to the base line) and in particular
5. The ratio of the length of the base line to the shortest distance between the base line and the surface or area being measured, i.e. the stand-off.

Generally, unless the ratio of base line length to stand-off is high (in the order of about one) good resolution in the z direction is very difficult. It will thus be apparent that with the fixture inter-connecting the projecting and receiving stations, the spacing and thus the length of the base line is severely limited and for this reason these systems have normally only been used in relatively close quarters, i.e. base lines up to 1 meter with spacings between the area or surface being examined and the apparatus (the stand off) of up to 2 meters are common.

In all of these devices the exposure time per unit area illuminated or rate of scanning is substantially constant over the complete area being scanned.

BRIEF DESCRIPTION OF THE PRESENT INVENTION

It is an object of the present invention to provide a new scanning system for scanning large areas from substantial distances.

It is a further object of the present invention to provide an adaptive scanning system wherein the scanning rate over selected areas is changed depending on the strength of signal received from that area.

Broadly the present invention relates to an apparatus for effective long range scanning using a triangulation system comprising a projecting station having means for projecting a light beam, means for directing said light beam and a target having a peep hole therethrough through which said light beam may be directed, a first base on which said projecting station is mounted, said first base being rotatable about a first axis and means for mounting said first base including means to adjust the orientation of said first axis relative to the world, a light receiving detector station having a camera means, said camera means having a focal axis and an array of photo sensitive detectors arranged in mutually perpendicular rows in a plane substantially perpendicular to said focal axis, said light receiving station being mounted on a second base, said second base being rotatable about a second axis, means for mounting said second base including means to adjust the orientation of said second axis relative to the world, a reflector means mounted on said camera means with its reflective surface in a plane parallel to said focal axis and at a selected angle to one of said mutually perpendicular rows of photo sensitive detectors, said second axis being perpendicular to said focal axis and parallel to said plane.

Preferably said selected angle will be 90°.

Preferably said light projecting means will be a laser.

Preferably said detectors will be CCD detectors and each said detector will generate a discrete signal corresponding to the amount of light received.

Preferably said laser will project light onto a light directing means that will direct said light along a straight line path.

The present invention also relates to a method of establishing a base line between a light projecting station mounted to rotate on a first axis and a detector station having a focal axis and an array of photo detectors arranged in mutually perpendicular rows in a plane substantially perpendicular to said focal axis, said detector station mounted for rotation on a second axis substantially perpendicular to said focal axis, said method comprising directing a ray of light substantially perpendicular to said first axis through a peep hole in a target fixed on said first base, adjusting said first base to direct the beam of light toward said camera with said beam of light projecting through said peep hole until said beam of light is reflected from a reflector mounted on said detector station and having a reflecting plane substantially parallel to said focal and second axes back onto said target, fixing the orientation of said first base and adjusting the orientation of said second base to reflect said beam back to said target in substantially concentric relationship to said peep hole thereby to orient said first axis and said second axis to be substantially parallel and define a base line between said first and second axes and measuring the length of said base line between said first and said second axis to establish the base line for triangulation.

Preferably the angle of said focal axis and the angle of the direction of projection of said beam to said base line are each measured and the stand-off determined by triangulation.

Preferably a corner cube reflector will initially be used to direct the light beam back from the detector station to the projecting station for orienting said first axis and orienting of said second axis will be done with said corner cube reflector removed and a planar reflector in position.

The present invention also relates to a system for adaptively scanning a surface comprising scanning at least a portion of said surface at a first scan rate by directing a beam of light from a projecting station onto said surface, sensing said light beam reflecting from said surface in a detector station having a detector array with detectors arranged in mutually perpendicular rows in a plane substantially perpendicular to a focal axis of said detector station and producing a discrete digitized signal from each said detector of said array, each said signal having an intensity corresponding to the amount of light received by its respective of said detectors, thresholding said signals to determine those signals having strengths above a selected value indicating locations on said array to which said beam is reflected, determining areas on said surface from which no signal having strengths above said threshold have been received and rescanning said areas at a second scan rate slower than said first scan rate by increasing the amount of illumination per unit area to which said detectors are subjected to obtain a second scan of said selected area.

Preferably said second scan rate will be obtained by directing said beam of light onto said areas for a longer period of time during which said array of detectors is being exposed to light reflected from said areas.

BRIEF DESCRIPTION OF THE DRAWINGS

Further features, objects and advantages will be evident from the following detailed description of the preferred embodiments of the present invention taken in conjunction with the accompanying drawings in which;

FIG. 9 is a schematic illustration of a vertical scan line, i.e. in the y direction, over areas of different brightness.

FIG. 10 shows a section of the vertical scan line of FIG. 9 across the darkened area.

FIG. 11 provides typical illustrations of signals generated by the photo detectors scanning along the lines A, B and C in FIGS. 8 and 9.

FIG. 12 illustrates another system of processing the detected signals.

DESCRIPTION OF THE PREFERRED EMBODIMENTS

The term scan rate as used in the disclosure and claims defines the amount of illumination per unit area per time of exposure of the detectors (candle power/unit area/unit of exposure time) i.e. a fast scan rate applies less light (candle power) per unit area scanned per unit time of exposure e.g. light may be spread over a large area; and a slower scan rate will apply more light per unit area per unit time of exposure e.g. the light may be applied over a smaller area for each unit time of exposure.

Figure 1:
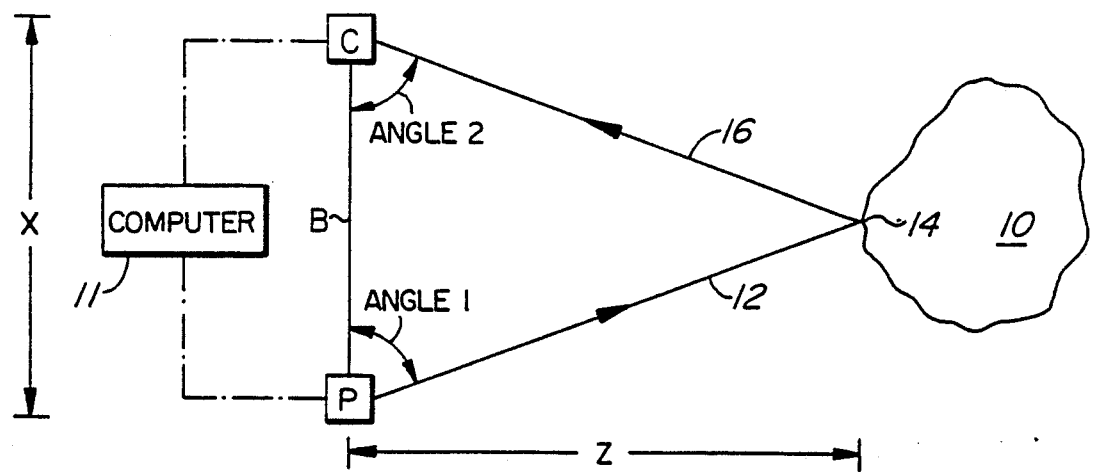
FIG. 1 is a plan view illustrating the known concept of triangulating coordinate finders.
Figure 2:
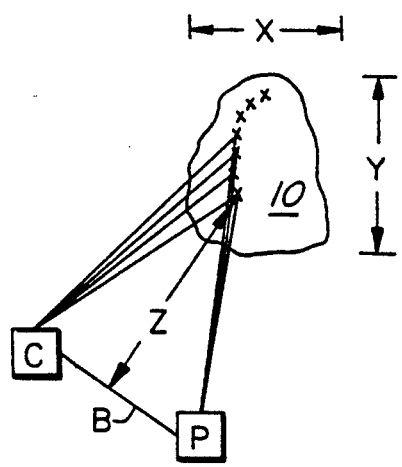
FIG. 2 illustrates a typical scanning pattern with the scan lines in the y direction.

FIG. 1 shows a typical device for measuring three-dimensional spatial coordinates (x, y and z tuples) by triangulating as taught in the prior art and as applicable to the present invention. In the illustrated arrangement, the object being investigated is indicated at 10. The projection station P projects light as a projected light beam 12 onto object 10 to illuminate a particular spot 14 and light is reflected from the surface of the object 10 as indicated by the reflected beam 16 to a detector or camera station C. To calculate the z dimension or off-set it is essential to know the spacing between the projecting station P and the detector station C which is known in the trade as the 'base line' and has been indicated by the letter B. In the prior art techniques the base line B is determined by a solid structure generally a metal plate on which the housings of the two stations P and C are rigidly mounted.

It is also essential to know angle 1 and angle 2 which are the angles between the base line B and the projected light beam or path 12 and the reflected beam or path 16 respectively. As above described the angle 1 is measured and the angle 2 is (assuming the camera is oriented at a known angle other than a right angle to the base line B) based on the angle of the camera to the base line and location on the detector array of the camera onto which the reflected beam is received i.e. the illuminated pixel in the CCD array of the camera in station C.

To inspect the whole of the article 10, a plurality of projected beams 12 or projection lines are directed onto the article 10 in a selected direction. In the illustrated arrangement a plurality of projected instantaneously illuminated spots are formed on the article 10, for example, by projecting a laser light onto a mirror and gradually changing the angle of the mirror to form a full scan line which in this case is a vertical scan line in the y direction. For longer distance scanning as intended with the present invention the use of a projected spot or beam of light is much more effective than a using a projected line of light since the instantaneous illumination intensity is higher when a high intensity spot is projected and moved along the scan line than if the light is diffused along the full length of the scan line.

Figure 3:
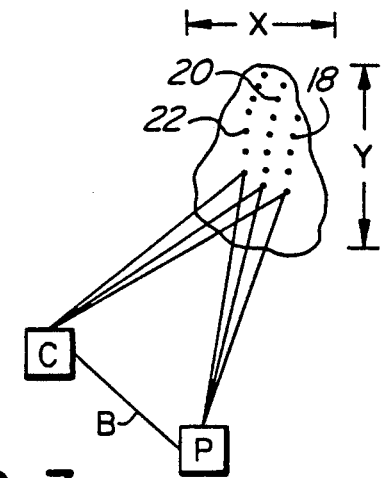
FIG. 3 shows a schematic illustration of side by side scan lines (horizontally spaced) that will be projected in sequence on the surface being examined.

As illustrated in FIG. 3 a plurality of vertical scan lines 18, 20, 22, etc. are formed in sequence along vertical lines, i.e. in the y directions, spaced in the x direction, i.e. the scan line 18 would be scanned at an angle 1 of a first value, scan line 20 at angle 1 of a second value, scan line 22 at an angle 1 of a yet another value, etc., until the full area to be scanned has been exposed.

The information or signals from the detectors (CCD array) are fed to a suitably programmed computer 11 that performs the triangulation calculations and controls the operation of the projecting station P to produce the line or spots 14 and the sequentially formed scan lines 18, 20, 22, etc.

Figure 4:
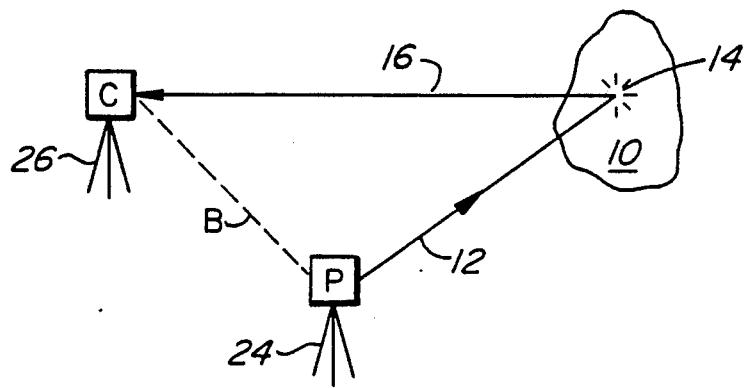
FIG. 4 is a schematic illustration of the present invention.

FIG. 4 schematically illustrates the present invention. As can be seen, the stations P and C are not fixed together by a connecting structure but are each mounted on their own separate mounting 24 and 26 with no fixed structure between the two stations, rather the two stations are inter-connected by a measured but imaginary base line indicated at $B_i$ which must be determined to permit the triangulation technique described above to be used.

Before describing the technique for aligning the two stations, each one of the stations will be described.

Figure 5:
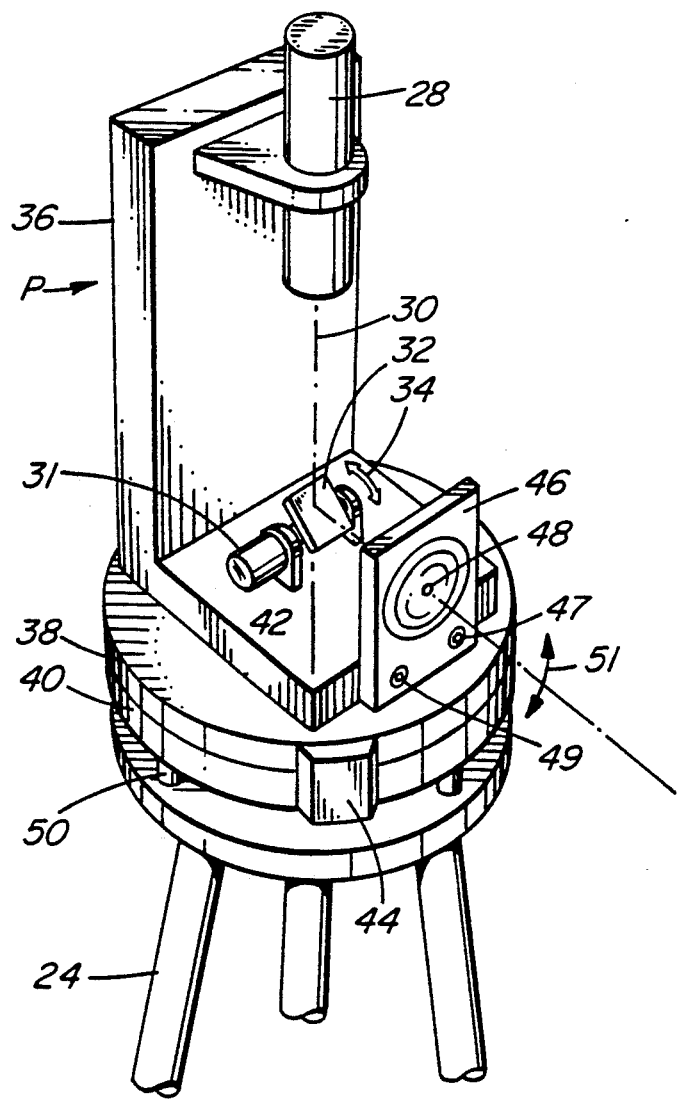
FIG. 5 schematically illustrates a projecting station with a target removably mounted thereon.

The station P as illustrated in FIG. 5 includes a light source 28 which preferably will be a laser and directs a beam of light 30 onto a reflecting surface or mirror 32. The mirror 32 may be wobbled by a suitable drive motor 31 as indicated by the arrow 34 to direct the beam of light up and down in a vertical plane (Y plane) to instantaneously illuminate discrete regions on the scan line. Other systems may be used to direct the light beam, for example the laser may be manipulated to direct the beam as required.

The laser 28 and mirror 32 are mounted on a suitable support bracket 36 that in turn is mounted on a base 38. The base 38 is rotatably mounted on a platform 40 for rotation around an axis 42 preferably substantially aligned with the path of the beam 30 from the laser 28 to the mirror 32. The angular position of the base 38 to the platform 40 is adjusted and measured by a suitable drive motor and measuring device 44.

Also removably mounted on the structure 36 by pins 47 and 49 is a target 46 having a peep hole 48 through which a beam of light reflected from the mirror 32 is directed during the setting up of the system as will be described hereinbelow.

The platform 40 is mounted on a tripod 24 and can be suitably adjusted by adjusting elements 50 to orient the axis 42 as desired, normally to approach vertical although this is not essential.

The detector station C in the illustrated arrangement is provided with a camera mounted in the manner similar to the projecting station P in that the camera 52 is mounted on a base 54 which in turn is rotatably mounted for rotation around axis 56 on a platform 58. The orientation of the platform 58 and thus of the axis 56 is adjustable relative to the tripod support 26 by suitable adjusting elements 60 (see FIGS. 7 and 8).

Figure 6:
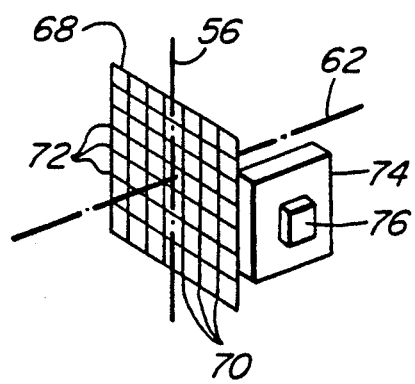
FIG. 6 is a schematic illustration of the CCD array orientation relative to the focal axis of the camera and the reflecting plane.

Referring to FIG. 6, the camera has a focal axis 62 that is directed preferably toward the centre of a CCD array 68 positioned in a plane, oriented substantially perpendicular to the focal axis 62. The rotational axis 56 is also perpendicular to the axis 62.

Preferably the individual cells on the CCD (detectors) are arranged in mutually perpendicular rows as indicated at 70 and 72 and preferably one of the rows (rows 70) is substantially parallel to the axis 56.

To permit proper orientation of the two stations C and P, the camera is provided with a reflector 74 that is mounted to have its reflecting surface in a plane substantially parallel to the focal axis 62 and also substantially parallel to the rotational axis 56 as shown in FIG. 6, i.e. parallel to the rows 70.

For the initial alignment to set the direction of the base line, the reflector 74 is preferably provided with a corner cube reflector 76 which will direct a beam back in the direction from which it has been projected.

Figure 7:
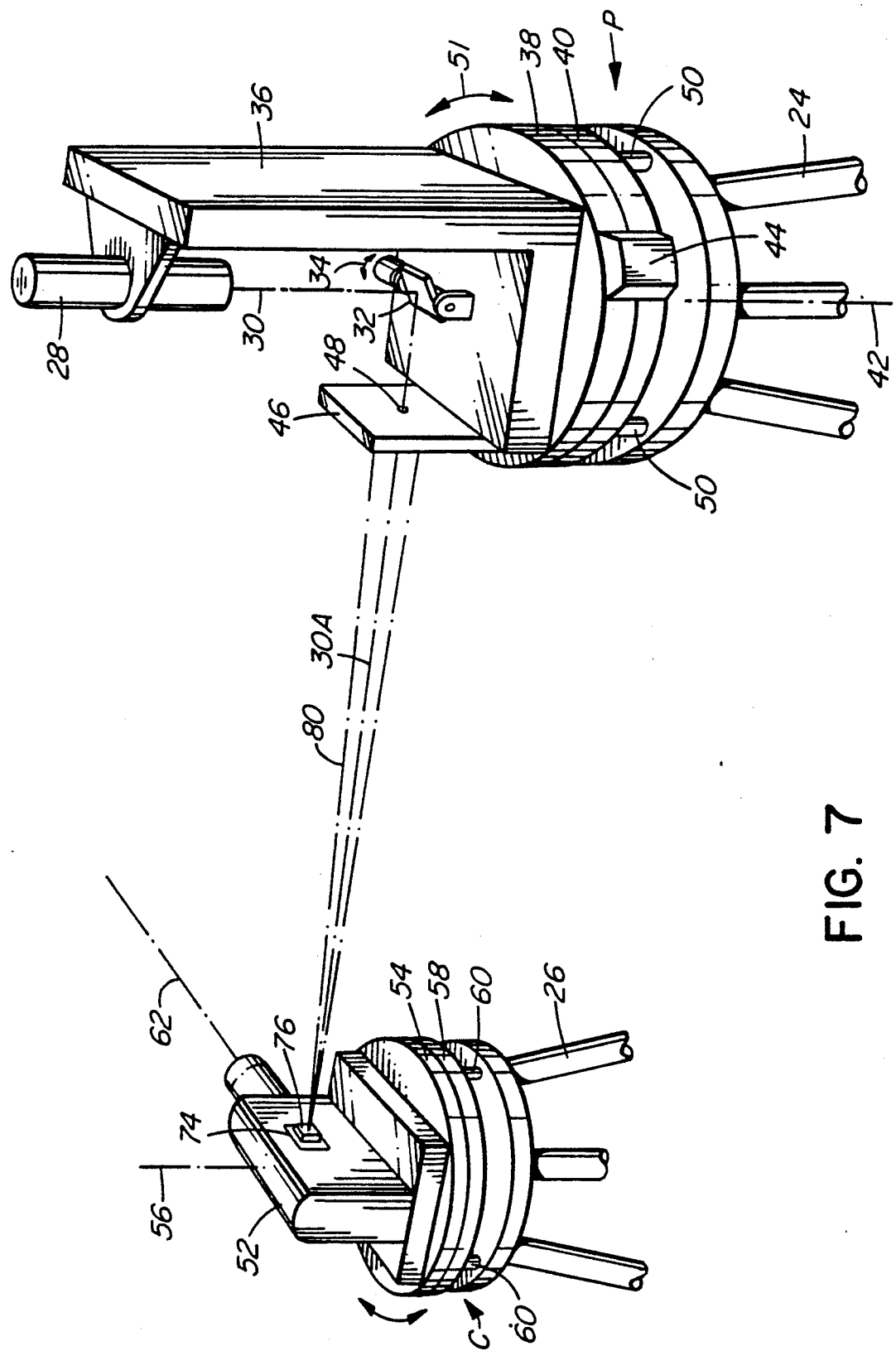
FIG. 7 is a schematic illustration of the first step for establishing the base line between the detector station and the projector station.

To obtain the base line or the direction of the base line, the camera is lined up with the mirror 74 facing the target 46. As shown in FIG. 7 the base 38 is rotated to position the target 46 so that the target 46 and reflector 74 are substantially parallel.

The angle of the reflector 32 is adjusted to direct the beam 30 from the reflector 32 and through the aperture 48 toward the camera and the orientation of the axis 42 and position of the target 46 are adjusted until the beam intercepts the corner reflector 76 and is reflected back onto the target 46. This then fixes the position of the axis 42 and thus platform 40 and base 38.

Figure 8:
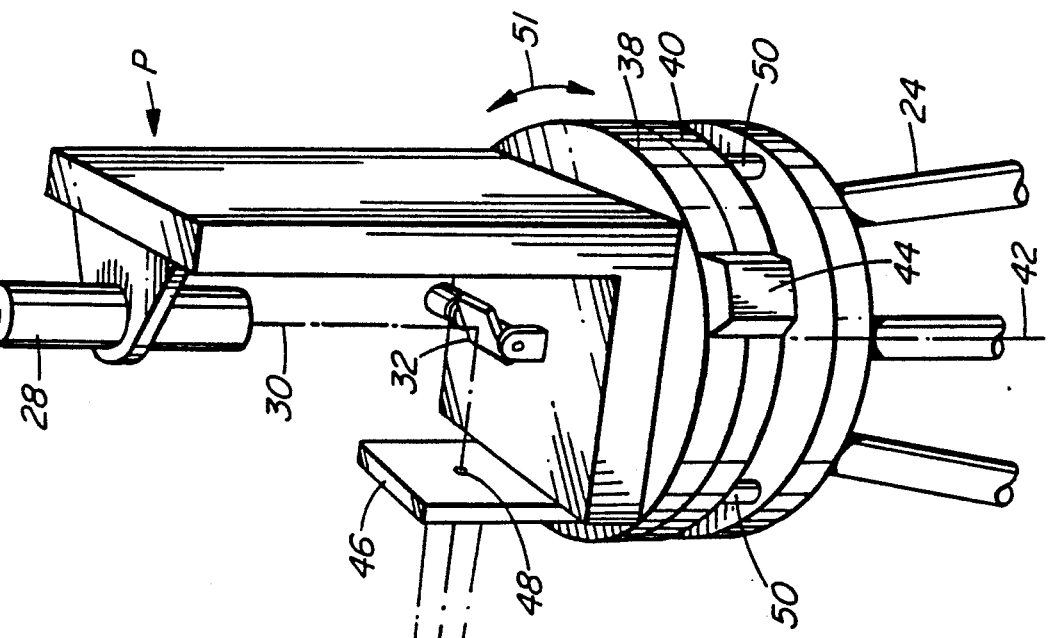
FIG. 8 is a view similar to FIG. 7 but showing the final step in orienting the rotational axis of the detector and projector stations.
Figure 8:
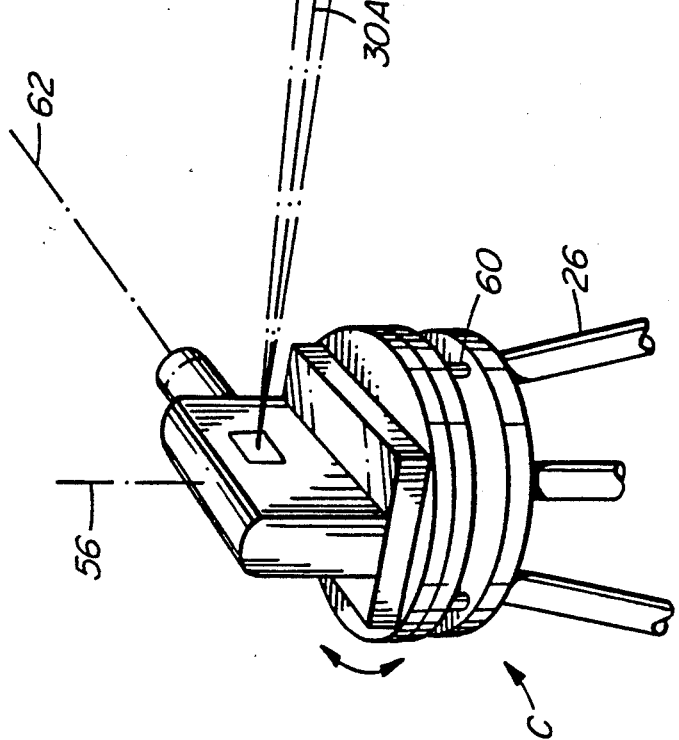

The corner reflector 76 is now removed from the mirror 74 and the orientation of the axis 56 is adjusted by the elements 60 to reflect the light back onto the target as illustrated in FIG. 8 so that the reflected light beam 80 is concentric with the projected light beam 30A projected through the peep hole 48.

With the two systems arranged as described, the base line $B_i$ is established and it is only necessary to measure the distance between the two axes 56 and 42 to establish the length of the base line. If desired, the camera may now be adjusted angularly with respect to the base line $B_i$ by rotation on axis 56 to define the angle 2 as illustrated in FIG. 1. Angle 2 will then be set.

The projecting station P is then rotated around the axis 42 and the angle of the beam reflected from the reflector 32 to the base line $B_i$, i.e. angle 1 is set and measured by the angle measuring device 44 which is under control of and feeds the angular measurement back to the computer 11 as above indicated.

It will be apparent that the base line $B_i$ is measured between the axes 42 and 56 and the length of the base line $B_i$ is established. Further, since the orientation of the focal axis 62 relative to the base line $B_i$ is set thereby setting angle 2 by measuring angle 1, all of the coordinates necessary to calculate the off-set or z dimension are available. The base line $B_i$ defined in space will normally have a length greater than 1 meter preferably greater than 10 meters and up to 100 or more meters thereby providing for accurate scanning of relatively large areas spaced in a significant distance from the two stations C and P.

When scanning objects, whether they be far away or close, problems are encountered when the reflected signal strength is different due to any one or more of surface reflectivity, surface colour, surface distance, surface angle and/or ambient light, etc.

FIG. 9 shows a typical vertical scan line 100, i.e. a scan line extending in the y direction traversing detectable regions with the exception of a hatched region 102 wherein the amount of light reflected is significantly less than that of the remainder of the scan line.

FIG. 11, scan line A, indicates a typical signal received by the detectors aligned to receive light along the line A of FIG. 8. It will be apparent that there is a peak 104 that corresponds with the reflection from the scan line 100 at this height in the y direction.

In the area 102, due to reduced reflectance, the amount of light received as indicated by signal line B in FIG. 11, is not significantly different in the area of the beam 100 than the other areas on which the beam is not shining.

One way of determining the location of the scan line 100 on the array aligned with line A is to threshold the signal A for signals above a certain threshold as indicated by the threshold line 106. It will be apparent that the peak 104 extends above this threshold and thus indicates the location on the CCD array or the pixel that indicates the location of where the reflection of the scan line 100 is received on the array. Signal B on the other hand has no projections exceeding the threshold level 106 and thus does not shown any location for the scan line 100.

If, as is usually done, no further scanning of the object in this area is carried out, then the area corresponding probably to the whole hatched area 102 will not be determined.

When practising one facet of the present invention, the signals generated by each scan line 100, i.e. each of the scan lines 18, 20, 22 etc. will be reviewed for areas wherein no location has been found, i.e. no signal above the threshold has been found and these areas will be rescanned by redirecting the beam preferably only to these areas and in decreasing the scan rate so that the time of exposure for the line 100A (FIG. 10) traversing the area 102, i.e. which is a length $y_2$, significantly shorter than the length $y_1$ of the scan line 100 in FIG. 9, is exposed for a longer period of time than the time of exposure generated by the line 100 traversing the area 102 so that the signal generated by the scan line 100A along the line of pixels as indicated at C will now likely generate a signal as indicated at C in FIG. 11 that is stronger or higher than the threshold 106 to provide a reading in this area as indicated by the peak 108.

If, after the second scan at the slower rate, areas are still found where no signal is generated, these areas may be rescanned at yet a slower rate and this process repeated as desired.

If after a second scan no signal is yet found in the area then the scan rate will be further reduced (made slower) and only a portion of the area will be scanned i.e. the beam will be directed only at a portion of the area from which no effective signal has been received e.g. by reducing the angle through which the reflecting surface 32 is moved in a unit time of exposure. Obviously a limit will be set for the number of times the size of the region will be reduced, if no effective signal is received, and the software will be set to repeat for any selected region only a preset maximum number of times. The preset number of times may be changed depending, for example, on the distance being scanned, the type of day e.g. overcast, etc.).

Obviously the scan rate may be changed in a variety of different ways. If for example the detector station is using a variable exposure camera the exposure time may be changed (as well as the illuminated area) to increase or decrease the candle power to which the detectors may be subjected per exposure or frame. It is also possible with some cameras to adjust the field of view and focus to view only a part of the area illuminated.

In some cases, it is desirable to first image the area using the camera only without the beam 12 or 30 being projected and thereby provide a base signal as indicated by signal D in FIG. 12. This base signal is then subtracted from the signal indicated at E obtained in the same area when the beam of light is being projected. It will be noted that the signal E has two peaks, 110 and 112 that traverse the threshold 106, however the signal D shows a peak 114 corresponding to peak 112 indicating that peak 112 was not generated by the scanning beam.

When the signals D and E are substracted, the resultant signal F has no peak corresponding to peak 112 leaving only the peak 110 extending above the threshold 106 and thereby providing a clearer more easily read signal defining the location of the light beam.

Figure 13:
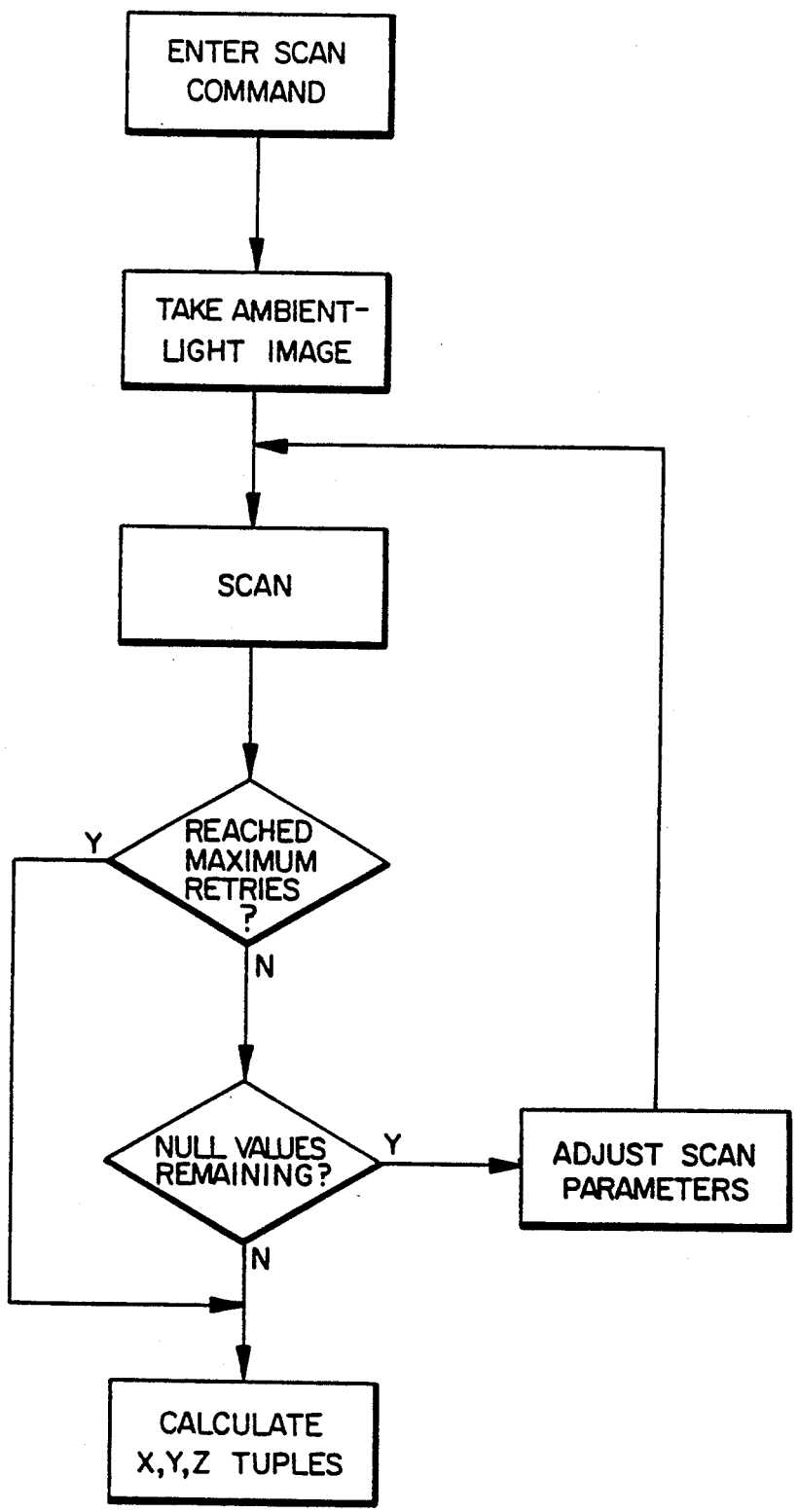
FIG. 13 is a flow chart for an adaptive scanning system incorporating the present invention.

FIG. 13 shows a typical flow chart illustrating the above described adaptive scanning system.

Having described the invention, modifications will be evident to those skilled in the art without departing from the spirit of the invention as defined in the appended claims.

We claim:

1. A method for adaptively scanning a surface comprising scanning said surface at a first scan rate by directing a beam of light onto said surface, sensing said light beam reflecting from said surface in a detector station having a detector array with detectors arranged in mutually perpendicular rows in a plane substantially perpendicular to a focal axis of said detector station and producing a discrete digitized signal from each said detectors of said array, said signals having an intensity corresponding to the amount of light received by its respective said detector, thresholding said signals to determine those signals having strengths above a selected value indicating locations on said array to which said beam is reflected, determining areas on said surface from which no signal having a strength above said threshold has been received and rescanning at least one of said areas at a second scan rate slower than said first scan rate by increasing the amount of illumination per unit area scanned to which said detectors are subjected to obtain a second scan of said selected area.

2. A method as defined in claim 1 wherein said second scan rate is obtained by directing said beam of light onto said areas for a longer period of time during which said array of detectors is exposed to light reflected from said areas.

* * * * *